United States Patent [11] 3,616,984

United States Patent

[11] 3,616,984

[72] Inventor William Louis Voroba
Fairfield, Conn.
[21] Appl. No. 2,744
[22] Filed Jan. 14, 1970
[45] Patented Nov. 2, 1971
[73] Assignee The Bunker-Ramo Corporation
Stamford, Conn.

[54] AUTOMATIC SOLDERING MACHINE HAVING CIRCUIT BOARD PROTECTION MEMBER
10 Claims, 4 Drawing Figs.

[52] U.S. Cl. 228/33, 118/423, 228/36, 228/39, 228/40
[51] Int. Cl. B23k 1/00, B23k 5/00
[50] Field of Search 118/423; 29/495, 471.1, 625; 228/36, 33, 37, 43, 39, 40

[56] References Cited

UNITED STATES PATENTS

| | | | |
|---|---|---|---|
| 3,122,117 | 2/1964 | Marzullo et al. | 228/43 X |
| 3,112,723 | 12/1963 | Potocki | 228/43 X |
| 3,216,643 | 11/1965 | De Verter | 118/423 X |
| 3,277,566 | 10/1966 | Christensen | 29/471.1 |
| 3,386,166 | 6/1968 | Tardoskegyi | 29/625 |

*Primary Examiner*—John F. Campbell
*Assistant Examiner*—R. J. Craig
*Attorney*—Frederick M. Arbuckle

ABSTRACT: An automatic soldering machine having one or more strips positioned in the solder pool to prevent the application of solder to selected areas of a circuit board. The strip is of a material which has stable dimensions and is heat resistant to a temperature at least equal to melting temperature of the solder utilized, is resistant to the accumulation of solder, and is preferably of a low-friction material.

INVENTOR
WILLIAM L. VOROBA

Ronald J. Kransdorf
ATTORNEY

AUTOMATIC SOLDERING MACHINE HAVING CIRCUIT BOARD PROTECTION MEMBER

This invention relates to machines for automatically soldering circuit boards, and more particularly to a member suitable for use with such machines to prevent the application of solder to selected areas of such boards.

BACKGROUND

Printed circuit boards, of the type which are presently utilized in most electronic systems and devices, have numerous components, such as integrated circuit modules, transistors, resistors, capacitors, and the like, mounted thereon, with the leads of each of the components projecting through holes in the board. These leads are mechanically and electrically connected to the board by soldering. Hand soldering these leads is an expensive and time-consuming operation and, with high-density boards, is also quite difficult. In order to avoid the difficulty and expense of hand soldering, automatic soldering machines have been developed.

The most commonly used of the automatic soldering machines are a wave soldering device. With such machines, molten solder is pumped from a reservoir and permitted to flow through a solder streambed to an opening which returns the solder to the reservoir. The boards are carried by a carriage over the solder stream at a height such that the solder makes contact only with the underside of the board. Solder flux applied to the underside of the board permits the solder to adhere only to the areas of the board where solder is desired.

One problem which has been encountered in the use of such wave soldering machines is that, as the board passes over the solder stream, solder also tends to adhere to certain areas of the board to which solder is not to be applied. For example, most boards have printed circuit fingers along one edge which are utilized to connect the board to the remainder of the electronic circuit in which they are utilized. Solder on these fingers could cause short circuits and other problems. Boards may also have plated-through holes at various points thereof through which pins may later be passed to interconnect the boards of a circuit. Solder on these holes could likewise cause problems.

The standard method which has been used for a number of years to prevent solder from being applied to undesired areas is to wrap tape around these areas before the board is put on the soldering machine. After the board has been soldered, a tape removal operation is thus required. Further, since some of the glue from the tape may adhere to the board contacts, a third operation, namely the cleaning of the tape residue, must also be performed. Thus, three additional operations must be performed on a board in order to protect selected areas thereof. These three additional operations involve significant cost both with respect to operator time and, to a lesser extent, with respect to additional materials required. The likelihood of damage to the board also increases with each additional operation which is performed on it.

More recently, one step in the board protection operation has been eliminated by either covering the area which is not to be soldered with a silicon rubber sleeve before putting the board in the soldering machine, and removing the sleeve after the board has been soldered; or by applying a solder-resist material to these areas and then cleaning the resist material after the soldering operation. The sleeves, however, are bulky, thus somewhat impending the operation of the machine, and also, because of the tight fit which is required to prevent solder from seeping through, the sleeves are somewhat difficult to apply. Further, the sleeves are relatively expensive. The use of solder-resist material involves similar problems.

It is, therefore, apparent that significant savings in time and cost could be achieved if the soldering machine itself could be modified to prevent solder from being applied to selected areas of the board. The problem is complicated by the fact that the plating on the board is relatively thin and may be damaged if rubbed under any pressure against a protective member. An attempt to raise areas of the card which are not to have solder applied to them above the solder bed would cause uneven application of the solder to other areas and could ruin the board by permitting solder to come over its top. This approach would also not solve the problem where the area to be protected is somewhere other than along an edge of the board. Similar problems exist in machines operating with stationary rather than a moving pool of solder and where the board is moved in contact with the solder pool by means other than a carriage.

It is, therefore, a primary object of this invention to provide an automatic soldering machine which is capable of preventing solder from being applied to selected areas of a printed circuit board.

GENERAL DESCRIPTION

The object of this invention is achieved by mounting in the solder pool, a member of a material which has stable dimensions and is heat resistant up to a temperature at least equal to that at which the solder utilized melts, and is resistant to the accumulation of solder. The strip extends over the length of the solder pool and covers such areas of the solder pool as would normally be passed over by the area of the circuit board to be protected. The height of the member is not higher than that of the solder pool and is preferably slightly below it. Thus, while there may be some minimal contact with the member as a board passes over it, this contact is not under pressure and results in no damage to the board. If the member is of a low-friction material, the possibility of damage from such contact is further reduced. The strip member serves to break the solder wave and, so long as the member is of substantially the same height as the solder pool, the high surface tension of the solder will prevent the solder from flowing over the top of the member to make contact with the protected areas.

The foregoing and other objects, features and advantages of the invention will be apparent from the following more particular description of a preferred embodiment of the invention, as illustrated in the accompanying drawings.

Figure 1:
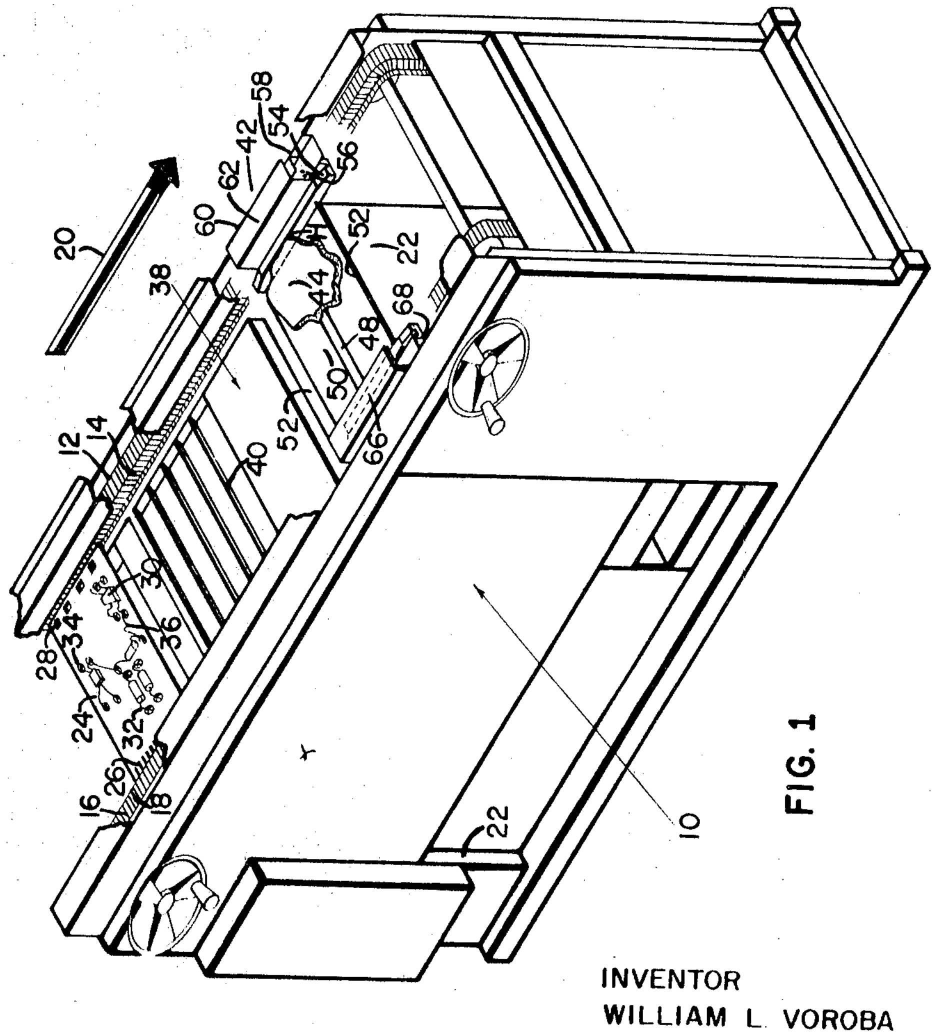
FIG. 1 is a partially cutaway perspective view of a wave soldering machine utilizing the teachings of this invention.

Referring now to FIG. 1 it is seen that the wave soldering machine 10 includes a track 12 having teeth 14 and a track 16 having teeth 18, which tracks are adapted to be driven in direction 20 by a conventional drive mechanism in housing 22. The manner in which the drive mechanism functions to move tracks 12 and 16 is well known in the art and does not form part of the present invention. Fingers 14 and 18 are adapted to support one or more circuit boards 24 which are to have solder applied to their underside.

For simplicity of illustration, the circuit board 24 in FIG. 1 has been enlarged and only a small portion of the components and wiring which it would contain have been shown. The illustrative board has a plurality of conductive fingers 26 along one edge, which fingers are utilized to connect the board to the remaining elements of an electronic circuit. The board also has a plurality of plated-through holes 28 through which conductive rods may subsequently be placed to interconnect the boards of an electronic circuit. While, in the illustrative embodiment, holes 28 have been shown only along one edge of the board, on large boards a row of such holes may also appear near the center of the board. As was previously indicated, solder is not to be applied to either fingers 26 or holes 28. Board 24 may also contain a plurality of discrete components 30, such as flatpacks, transistors, capacitors, resistors, and the like, each of which has a plurality of leads 32 projecting therefrom which pass through corresponding holes 34 in the board. It is desired that solder be applied to the portion of the leads 32 projecting through holes 34 so as to mechanically and electrically connect the components 30 to the board. Printed-circuit wiring 36 appears on the board to interconnect the various elements.

Board 24 is carried by tracks 12 and 16 over an area 38 of the machine, which may, for example, contain heating elements 40 to preheat the board, to a soldering station 42. At the soldering station, molten solder 44 from a reservoir contained in housing 22 is pumped through opening 48 to a height H and permitted to flow in either direction across bed 50 into openings 52 which lead back to the reservoir.

Figures 3, 4:
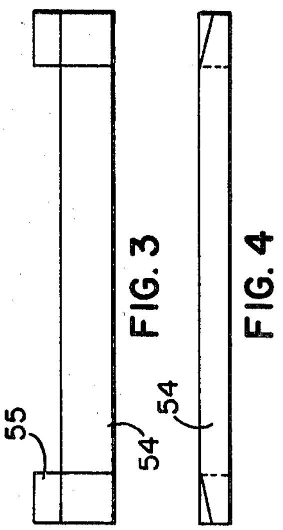
FIGS. 3 and 4 are a top and front view respectively of a protective strip suitable for use in the preferred embodiment of the invention shown in FIGS. 1 and 2.

Positioned along one side of solder stream 44 is a strip 54 of a material which has stable dimensions and is heat resistant to a temperature of at least 600° F., a temperature somewhat above that of the molten solder, and is resistant to the accumulation of solder. For reasons which will be discussed shortly, the strip 54 should also be of a low-friction material. A material which ideally fulfills the above requirements is tetrafluorethylene, which is generally sold under the trademark Teflon; however, other materials, such as stainless steel, which fulfill these requirements may be utilized. Referring now to FIGS. 3 and 4, it is seen that the leading and trailing edges of the strip are tapered so as to eliminate any possibility of a board hanging up on the leading edge of the strip and to generally facilitate passing-over operation. A pair of flanges 55 are provided for use in securing the strip to the machine.

Figure 2:
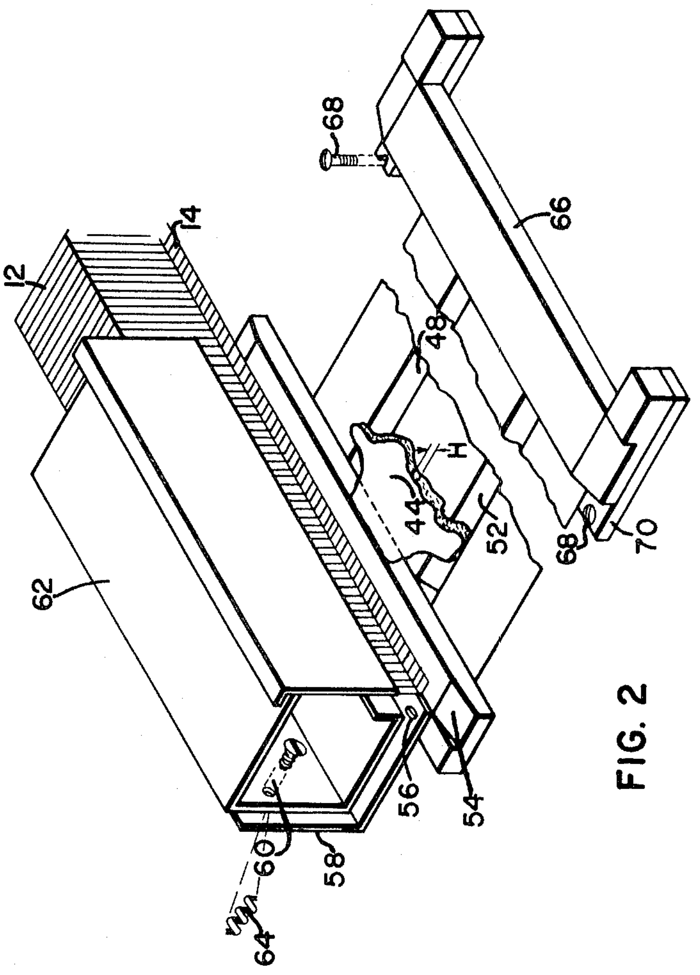
FIG. 2 is an enlarged perspective view of a portion of the wave soldering machine shown in FIG. 1.

As may be seen in FIG. 2, strip 54 is secured by screw 56, or other suitable means, to plate 58. Plate 58 is secured by screws 60 to housing 62 which is mounted on housing 22. Springs 64 maintain the spacing between the plate 60 and housing 62. Strip 54 projects into solder stream 44 a sufficient distance so that holes 28 pass over it rather than over the solder stream, is of a length somewhat longer than that of the solder stream, and is of a height which is substantially the same as the height H of the solder stream. In practice, in order to minimize friction on the underside of board 24, strip 54 would be of height slightly less than H. It has been found that if the difference in height between the solder stream 44 and strip 54 is maintained at ⅜ inch or less, the surface tension of the solder will prevent any solder from flowing over the top of the strip. The exact height at which the surface tension of the solder breaks down depends on many factors including the type of the solder utilized, and, therefore, in practice, the difference in height should be maintained at significantly less than ⅜ inch figure mentioned above.

On the other side of solder stream 44, there is a strip 66 which is generally the same material as strip 54. Again, Teflon has been found to be an ideal material for the purpose. Strip 66 projects into solder stream 44 a sufficient distance so that fingers 26 pass over strip 66 rather than over the solder stream, and is of substantially the same length and height as the strip 54. The distance which strips 66 project out into solder stream 44 may be controlled by loosening screw 68 and moving base assembly 70 to which strip 66 is secured. This provides a means for compensating for variations in the length of fingers 26 on various circuit boards.

Since as indicated above, solder does not flow over the tops of strips 54 and 60, no solder is applied to the protected areas of boards 24 as the board is carried by the tracks over the strips. Since pressure is not relied upon to keep solder from reaching the protected areas of the board, there is no pressure contact between the strips and the board which would cause damage to the plating on the board and, in practice, a slight clearance may exist between the elements. In any event, the use of a low-friction material, such as Teflon, minimizes the possibility of damage to the board coating.

After passing through soldering station 42, the board may be removed from the tracks in any standard manner. Since no protective material or substance was applied to the board for the soldering operation, no additional operations are required on the board after removal from the machine to place the board in condition for use.

While, in the drawings, strips 54 and 66 have been shown along the edges of solder stream 44, a strip of this material may be placed across the solder stream at any point which will be passed over by an area of circuit board 24 to which solder is not to be applied. The manner in which this strip would serve to protect the board would be identical to that described with reference to strips 54 and 66.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. A soldering machine for a circuit board which has an upper and a lower surface with at least one area of said lower surface to which solder is not to be applied, said machine having means for generating a solder pool of a predetermined height; and means for moving said board over said solder pool with the surfaces of said board parallel to said solder pool, said board being at a height such that only the lower surface of said board contacts said solder;

characterized by the inclusion, in said solder pool of a strip formed of a material which has stable dimensions and is heat resistant to a temperature at least equal to that at which said solder melts, and is resistant to the accumulation of solder flux, said strip being positioned (a) to extend over the entire length of said solder pool, (b) to cover an area of said pool having a width and oriented in said pool so as to be passed over by said board surface area to which solder is not to be applied as said board passes over said pool, but not to be passed over by any other areas of said board, and (c) to extend to a height which does not exceed the height of said solder pool, but is of sufficient height so that the surface tension of the solder does not break down permitting solder to flow over the top of said strip.

2. A machine of the type described in claim 1 wherein said area to which solder is not to be applied is along one edge of said board; and wherein said strip is secured along one side of said pool and projects out into said pool a distance at least as great as the width of said area to which solder is not to be applied.

3. A machine of the type described in claim 2 including means for permitting the distance which said strip projects into the said pool to be varied so as to compensate for variation in the width of said area on different circuit boards.

4. A machine of the type described in claim 2 wherein there are areas to which solder is not to be applied along both edges of said board; and wherein there is a strip secured along each side of said pool, each of said strips projecting into said pool a distance at least as great as the width of the board area which is to pass over it.

5. A machine of the type described in claim 1 wherein the material which said strip is formed is of a low-friction material.

6. A machine of the type described in claim 5 wherein said low-friction material is tetrafluorethylene.

7. A machine of the type described in claim 1 wherein said material has stable dimensions and is heat resistant to a temperature of at least 600° F.

8. A machine of the type described in claim 1 wherein the height of said strip is not less than the height of said solder pool by more than ⅜ inch.

9. A machine of the type described in claim 1 wherein said machine is a wave soldering machine; and wherein said pool is a continuously moving wave.

10. 10. A machine of the type described in claim 9 wherein said board-moving means is a pair of movable tracks adapted to carry said board over said solder wave.